US011292465B2

(12) United States Patent
Zhao et al.

(10) Patent No.: US 11,292,465 B2
(45) Date of Patent: Apr. 5, 2022

(54) ROADWAY VEHICLE SPEED PLANNING

(71) Applicant: Ford Global Technologies, LLC, Dearborn, MI (US)

(72) Inventors: Yanan Zhao, Ann Arbor, MI (US); Ming Cheng, Northville, MI (US); Girish Gokul Chennupalli, Farmington Hills, MI (US); Alex Szczepaniak, Ann Arbor, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 16/200,070

(22) Filed: Nov. 26, 2018

(65) Prior Publication Data

US 2020/0164874 A1 May 28, 2020

(51) Int. Cl.
*B60W 30/14* (2006.01)
*B60W 30/18* (2012.01)
*B60W 30/16* (2020.01)

(52) U.S. Cl.
CPC .......... *B60W 30/143* (2013.01); *B60W 30/16* (2013.01); *B60W 30/18127* (2013.01)

(58) Field of Classification Search
CPC ......... B60W 30/143; B60W 30/18127; B60W 30/16; B60W 30/18159; B60W 30/18154; B60W 50/0097; B60W 2720/106; B60W 2720/10; B60W 2552/30; B60W 2556/45; G08G 1/091
See application file for complete search history.

(56) References Cited

U.S. PATENT DOCUMENTS 8,352,111 B2   1/2013  Mudalige
2019/0385448 A1* 12/2019 Montemurro ........ G08G 1/0145
2020/0160704 A1*  5/2020 Choi ................ G08G 1/096716

FOREIGN PATENT DOCUMENTS

WO   2017098486 A1   6/2017

OTHER PUBLICATIONS

Rios-Torres, Jackeline, Malikopoulos, Andreas, "Online Optimal Control of Connected Vehicles for Efficient Traffic Flow at Merging Roads", 2015, IEEE, 18th International Conference on Intelligent Transportation Systems, p. 2433-2436 (Year: 2015).*

* cited by examiner

*Primary Examiner* — Aniss Chad
*Assistant Examiner* — Chase L Cooley
(74) *Attorney, Agent, or Firm* — David B. Kelley; Brooks Kushman P.C.

(57) ABSTRACT

A traffic controller includes a controller configured to reject a request and issue a speed requirement based on a priority to cause a speed of a one of a plurality of vehicles to be within a speed band before entering a road. The rejection is responsive to receiving the speed request from the one approaching the road having priority less than a predetermined threshold and outside of a speed band and a predetermined acceleration band of vehicles on the road.

16 Claims, 5 Drawing Sheets

ROADWAY VEHICLE SPEED PLANNING

TECHNICAL FIELD

This disclosure relates to speed planning for vehicles entering certain roadways such as roundabouts.

BACKGROUND

Roundabouts present unique conditions for vehicles. Although platooning of vehicles is known, organization of vehicle travel through roundabout roadways presents unique problems. For example, vehicles traversing roundabouts encounter events or obstructions related to the structure of roundabout roadways and other vehicles within the roundabout.

SUMMARY

A vehicle includes an electric machine. The vehicle includes a controller configured to adjust a speed of the vehicle via regenerative braking or propulsion of the electric machine according to a predetermined acceleration band and a speed requirement defined by a remote controller. The speed requirement is based on a speed request from the vehicle and a priority of the vehicle. The controller adjusts the speed responsive to indication of a predicted event on a roadway.

A traffic controller includes a controller configured to issue a speed requirement based on a priority to cause a speed of one of a plurality of vehicles to be within a predetermined speed band before entering a road. The issuance is responsive to responsive to receiving a speed request having a priority less than a predetermined threshold and defining a speed outside of the predetermined speed band from one of the plurality of vehicles approaching a road.

A traffic controller includes a controller configured to issue a speed requirement based on a speed request to cause a speed of a plurality of vehicles to be within a band of the speed defined by the speed request before a one of the plurality enters a road. The issuance is responsive to receiving a speed request having a priority greater than a predetermined threshold and defining a speed outside of the speed band from the one of the plurality of vehicles approaching the road.

DETAILED DESCRIPTION

Figure 1:
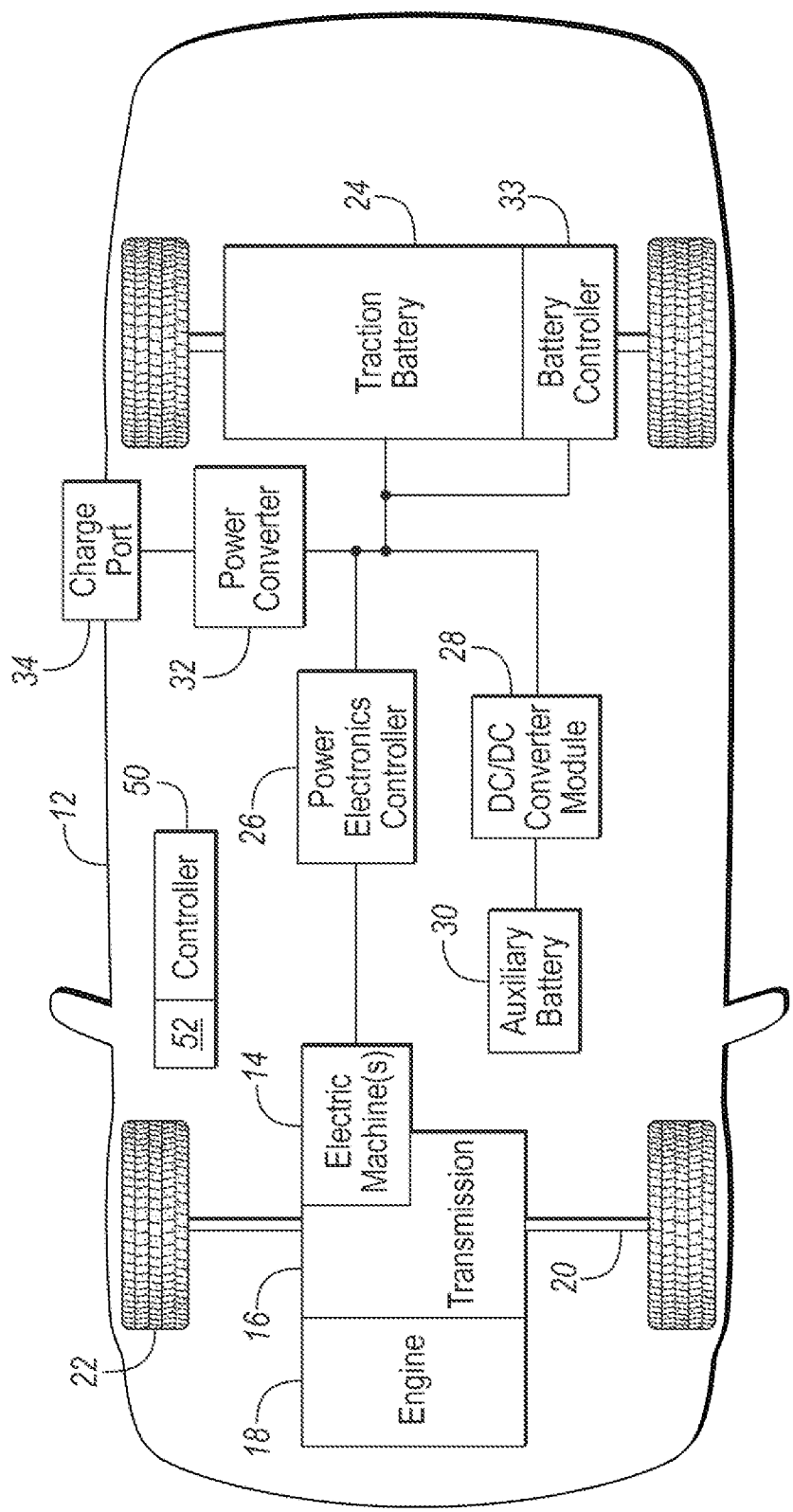
FIG. 1 is an overview schematic of a hybrid electric vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Fuel-efficient roundabout traversal may be orchestrated through vehicles and traffic controllers without compromising event and obstacle avoidance. A vehicle approaching a roundabout may—at many different times—transmit to a traffic controller information related to its approach, including speed, distance, priority information, and other parameters. The traffic controller may calculate a speed requirement to ensure the vehicle will enter the roundabout road or roadway without causing an event. An event may include drastic changes in speeds of other vehicles in the road or obstacle avoidance. For example, the traffic controller may instruct the vehicle such that it seamlessly enters the road without necessitating nearby vehicles to adjust speed.

The traffic controller may receive a requested speed from the vehicle and—based on priority information—provide a speed requirement to the vehicle depending on the priority information. The priority information may be supplemented or determined by one or both of the vehicle or traffic controller. The priority information may include the distance between the vehicle and locations in the road. The priority information may include obstacle avoidance maneuver information provided by the vehicle if drastic driving maneuvers are required. The priority information may include the anticipated count of events the vehicle will traverse while on the roundabout road or roadway. Additionally, the priority information may include the vehicles fuel efficiency attributes. For example, the vehicle may transmit vehicle information (e.g., make and model) to the traffic controller to determine the vehicle's fuel efficient band of operation (e.g., speed, acceleration, deceleration).

The traffic controller may set a predetermined acceleration band and speed band for vehicles traversing the road. As the vehicle approaches the road, a speed request may be transmitted to the traffic controller related to a current speed of the vehicle. If the speed is within the band or the vehicles in the road are able to meet that speed through the predetermined acceleration band, the traffic controller will accept the speed request and update the speed band for vehicles traversing the road. If the speed is outside of the band, the request will be rejected. Acceptance and rejection of the speed may be determined based on the priority of the vehicle approaching the road. For example, a vehicle with absolute priority may enforce speed demands on all other vehicles in the road. Vehicles with minimal priority have little weight attached to their requests. Indeed, vehicles can collectively determine a roundabout speed through priority of requests assigned according to situational factors. It should be appreciated that the traffic controller may be replaced by decentralized, self-governing vehicles communicating via V2V.

FIG. 1 depicts a block diagram 10 illustrating a vehicle 12 comprising one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. That is, the vehicle 12 may include regenerative braking as an operation of the traction electric machine or a combination of multiple traction electric machines. The electric machines 14 may also provide reduced pollutant emissions since the hybrid-electric vehicle 12 may be operated in electric mode or hybrid mode under certain conditions to reduce overall fuel consumption of the vehicle 12.

A traction battery (or battery pack) 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics controllers 26 through one or more contactors (not shown). The one or more contactors isolate the traction battery 24 from other components when opened and connect the traction battery 24 to other components when closed.

The power electronics controller 26 may also be electrically connected to the electric machines 14 and may be configured to bi-directionally transfer electrical energy between the traction battery 24 and the electric machines 14. For example, the traction battery 24 may provide a DC voltage while the electric machines 14 may require a three-phase AC voltage to function. The power electronics controller 26 may convert the DC voltage to a three-phase AC voltage as required by the electric machines 14. In a regenerative mode, the power electronics controller 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter 28. The low-voltage systems may be electrically connected to an auxiliary battery 30 (e.g., 12V battery).

A battery control module 33 may be in communication with the traction battery 24. The battery controller 33 may be configured to monitor and manage operation of the traction battery 24, such as via an electronic monitoring system (not shown) that manages temperature and charge state of each of the battery cells.

The vehicle 12 may be, for example, an electrified vehicle that includes components for a plug-in hybrid electric vehicle (PHEV), a full hybrid electric vehicle (FHEV), a mild hybrid electric vehicle (MHEV), or a battery electric vehicle (BEV). The traction battery 24 may be recharged by an external power source. The external power source may be a connection to an electrical outlet. The external power source may be electrically connected to electric vehicle supply equipment (EVSE) or charge station. The charge station may provide circuitry and controls to regulate and manage the transfer of electrical energy between the power source and the vehicle 12. The external power source may provide DC or AC electric power to the charge station.

The vehicle 12 may include a controller 50 for operating the vehicle 12 drive systems 18, 16. The controller may further be connected to the traction battery 24, traction battery controller 33, and other systems of the vehicle 12. The controller 50 may be connect to a communications module 52. The communications module 52 may provide communications offboard the vehicle 12. The communications module 52 may communicate via any known or unknown method. The communications module 52 may communicate over a vehicle-to-vehicle (V2V) protocol, cellular protocol (e.g., 3G, LTE, SIGTRAN), or other use other communications protocols. The communications module 52 may include transceivers, modulators, demodulators, encoders, decoders, and other circuits necessary for digital or analog communications.

Figure 2:
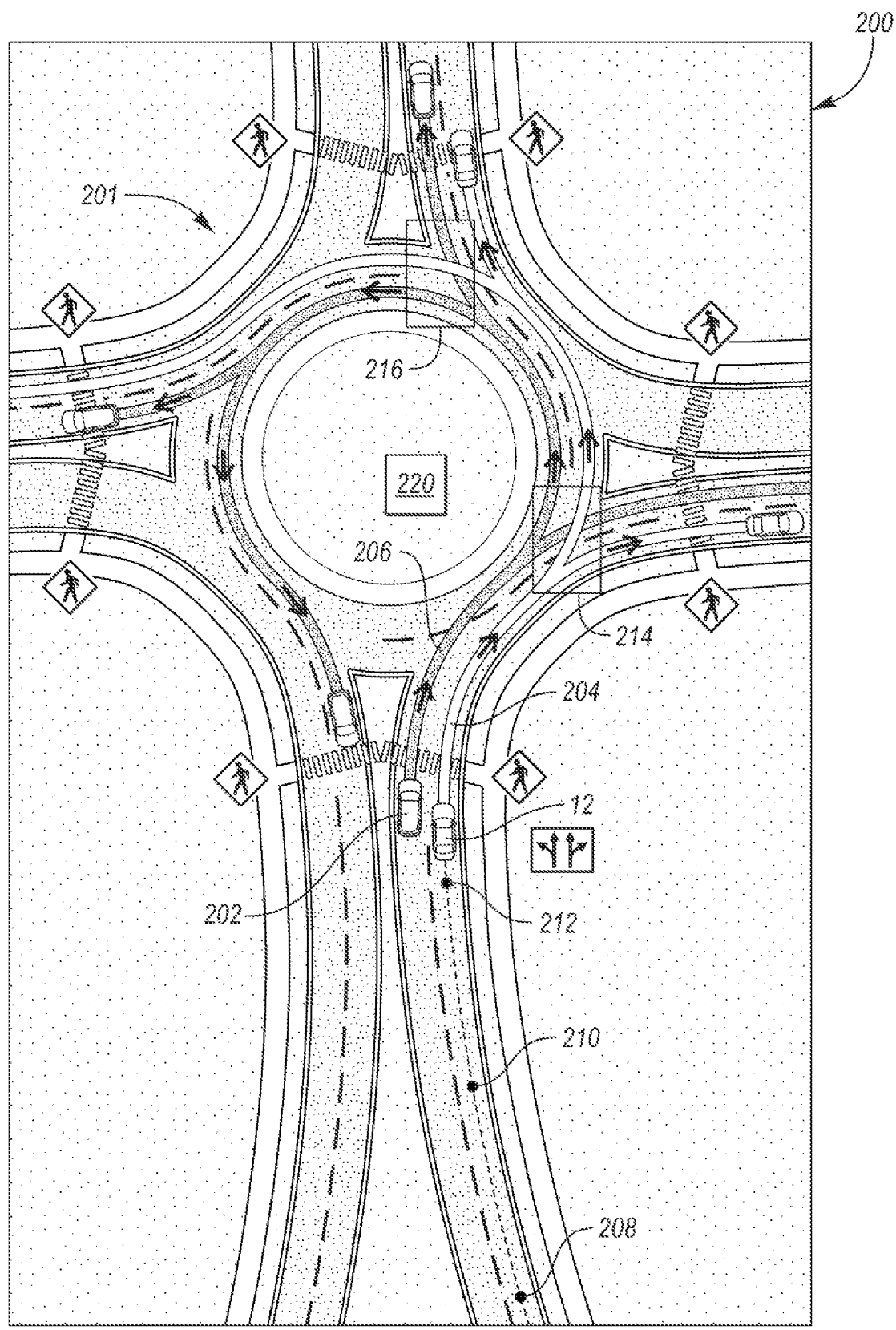
FIG. 2 is an overhead view of a roundabout roadway.

Referring to FIG. 2, a representation 200 of a roundabout road or roadway 201, is shown. The roundabout road 201 includes two travel lanes 204, 206 for vehicular travel. For example, vehicle 12 may be traveling in lane 204 and vehicle 202 may be traveling in lane 206. Vehicle 202 may be a representation of a plurality of vehicles 202 traveling in lane 206. For example, vehicles 202 may be approaching and already have entered the roundabout road 201. As the vehicle 12 approaches and crosses points 208, 210, 212, the vehicle controller 50 sends information to the traffic controller 220. The vehicle 12 may send additional communications to the traffic controller 220 during its approach to the roundabout road 201. As the vehicle 12 crosses each of the points 208, 210, 212, the vehicle 12 may send information related to its current speed, distance to the roundabout road 201, and other information pertaining to the vehicle's 12 priority. The traffic controller 220 sends speed requirements to the vehicles 12, 202 to avoid events at event position A 214 and event position B 216. The speed requirements may include positional requirements (e.g., reach speed X by event position A 214). The event positions 214, 216 may correspond to intersections of the lanes 204, 206.

Figure 3:
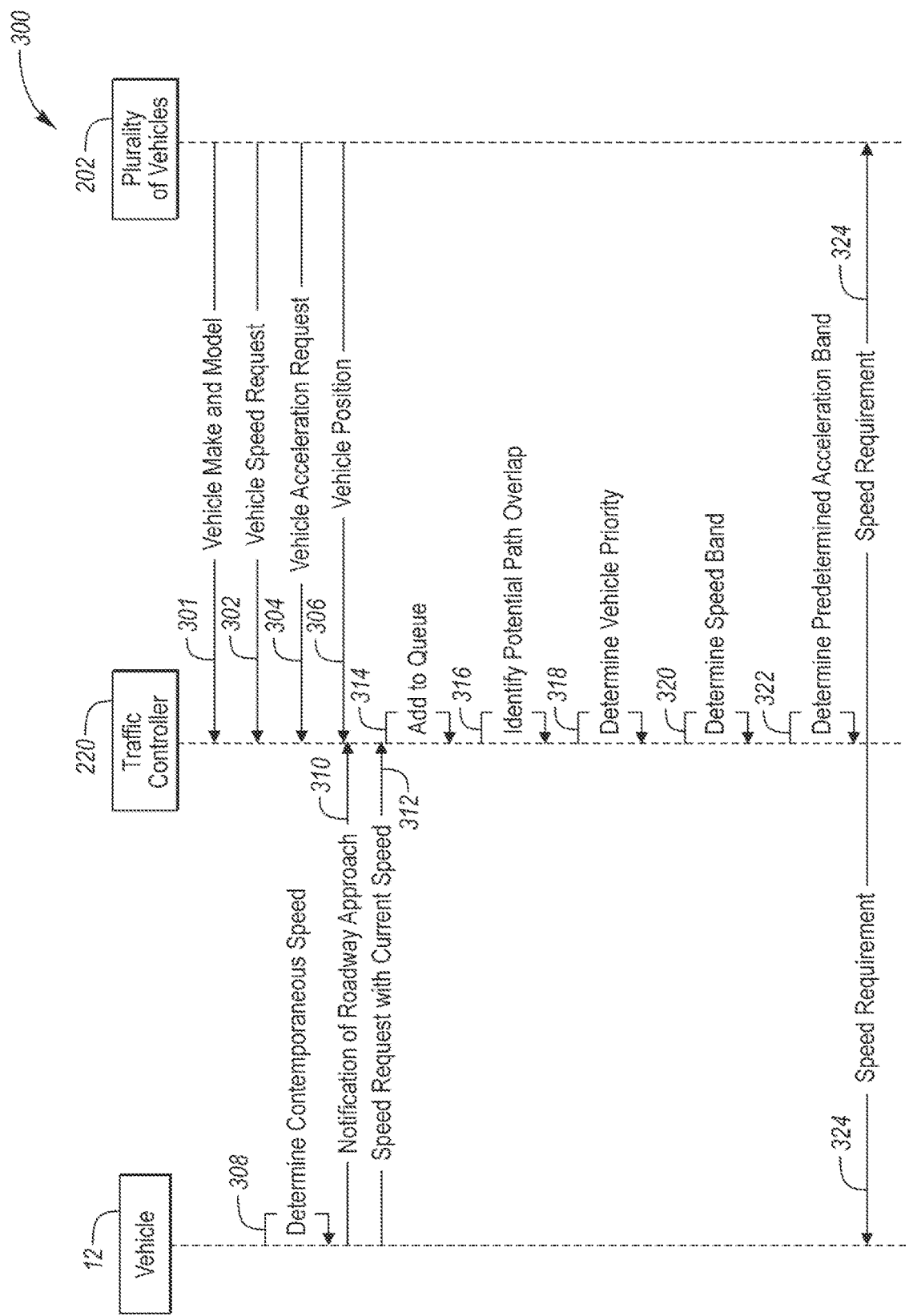
FIG. 3 is an algorithm for implementing portions of this disclosure.

Referring to FIG. 3, an algorithm 300 is shown. The algorithm 300 includes actions by a vehicle 12, a traffic controller 220, and a plurality of other vehicles 202. That is, the algorithm may be implemented on any V2I or V2X system. It should be appreciated that only one other vehicle may be present to implement at least a portion of the teachings of this disclosure. For instance, all of the steps disclosed and not disclosed by algorithm 300 may be implemented via V2V communications between two vehicles. It should be appreciated that any of the steps in any algorithm of this disclosure may be rearranged, omitted, or repeated. Some of the vehicles 12, 202 or all of the vehicles 12, 202 may perform some or all of the steps. A plurality of traffic controllers 220 may further perform some or all of the steps disclosed. Distinctions shown between the vehicle 12 and the plurality 202 are merely shown for clarity. All of the steps may be performed by any of the vehicles in communication with the traffic controller 220.

In step 301, the traffic controller 220 receives the vehicle make and model for all of the vehicles in the plurality of vehicles 12, 202. The vehicle make and model may be substituted by actual fuel efficient acceleration values or the traffic controller 220 may contact a separate server to retrieve the information. In step 302, the traffic controller 220 receives a vehicle speed request from the plurality of vehicles 12, 202. In step 304, the traffic controller 220 receives a vehicle acceleration request from the plurality of vehicles 12, 202. The vehicle speed request may be a band of requested speeds. The requested speed band may be based on a priority or urgency flag. The vehicle speed band may have an upper bound speed equal to the speed necessary for the urgent situation. If the urgent flag is not true, the upper bound speed of the speed band requested is the most desired speed for optimal energy efficiency for propulsive operation from the present time until the vehicle exits the roundabout 201. The upper bound vehicle speed of the speed band may be determined by each vehicle's powertrain control. The vehicle speed above which regenerative braking is still available may also serve as the lower bound speed of the vehicle speed band under the situation that braking is unavoidable as a result of the coordination. The lower bound may also be the same as the upper bound during urgent situations.

The vehicle acceleration request may be a band of requested accelerations. The minimum acceleration request may be similar to the minimum acceleration request described above. The accelerations and speeds may be based on vehicle parameters, including fuel-efficient operating conditions. In step 306, the plurality of vehicles 12, 202 sends current vehicle positions to the traffic controller 220. The positions sent in step 306 may include routes or path information the vehicle intends to use to navigate the roundabout.

In step 308, the vehicle 12, on approach and throughout approach points 208, 210, 212, determines its contemporaneous speed. In step 310, the vehicle 12 notifies the traffic controller 220 that of its approach. The vehicle 12 may include other important information including vehicle make and model, priority information, and fuel efficiency attributes. In step 312, the vehicle 12 may request a preferred roundabout road 201 speed. The preferred roundabout road 201 speed may be based on the vehicles contemporaneous speed. That is, fuel inefficiencies may be imposed if the vehicle 12 is required to slow down or speed up drastically from the contemporaneous speed.

In step 314, the traffic controller 220 receives the notification from the vehicle 12 and adds the vehicle to the roundabout road 201 queue. The traffic controller 220 then determines whether the vehicle 12 and other vehicles of the plurality 202 will intersect at any point within the roundabout road 201 in step 316. In step 318, the traffic controller 220 weighs the priority speed request of the vehicle 12 to determine whether it will adjust the speed of the plurality. The priority, for example, may be the distance between the vehicle 12 and potential overlaps with the plurality 202. The priority may also include an urgent flag that if true, gives the vehicle 12 request absolute priority, requiring adherence to the speed request even if it is beyond the fuel efficient acceleration range set above. For example, the vehicle 12 may require immediate deceleration of the plurality 202 because of an obstruction or event within the roundabout road 201. In other examples, the priority may be based on the number of intersections anticipated by the traffic controller 220 for the vehicle 12. For example, if the vehicle is going to traverse the entire roundabout road 201 (e.g., perform a U-turn), the vehicle is anticipated to have more potential intersections with the plurality 202 and receives a higher priority. Additionally, if the vehicle 12 has a very narrow fuel efficiency acceleration or speed band or a narrow fuel economy ranking, the vehicle 12 may be given a higher priority by the traffic controller 220.

Priority may be defined as a weighting factor for speed requests. For example, low priority weighting factors may have a numerical value of zero and high priority weighting factors may have a numerical value of one. After receiving all of the priorities, the traffic controller 220 will adjust the required speed sent to the plurality 202 if one of the priorities is above a predetermined threshold. The predetermined threshold may be a numerical value or a categorical value. For example, some of the priority factors previously discussed may categorically be above the predetermined threshold. The predetermined threshold may be exceeded if a combination of priority factors is above the threshold. For example, if the vehicle 12 has priority associated with fuel efficiency and potential intersections, the collective priority may exceed the threshold. As such, the traffic controller 220, after determining vehicle priority in step 318, sends the speed requirement to the plurality of vehicles 12, 202 to ensure that the roundabout road 201 is traversed without an event. Indeed, a vehicle 12, having a speed outside of a speed band and a priority less than the predetermined threshold will be required to increase its speed before specific points 208, 210, 212, or before entering the roundabout road 201. The vehicle 12 will adjust its speed according to fuel efficient acceleration limits imposed by the electric machines 14 and the engine 18. Also, a vehicle having a speed outside of a speed band and a priority exceeding the predetermined threshold will cause the plurality of vehicles 202 to adjust respective speeds to be within a speed band surrounding the vehicle 12 contemporaneous speed or anticipated speed while within the roundabout road 210. Additional, if an event is not detected, it is possible that no speed adjustments will be performed. If an event is detected the adjustment may take place from the vehicle 12, 202 having the lowest priority in an iterative manner such that only speed adjustments necessary to avoid the event are considered or performed by the vehicle 12, 202.

In step 320, the traffic controller 220 determines the speed band for the plurality of vehicles 12, 202 as described. That is, the traffic controller 220 may take an average of the received speed requests and apply a grace band of acceptable speeds during transit through the roundabout road 201. The range of the speed band may be set according to the predetermined acceleration band in step 322. The predetermined acceleration band may be based on the fuel efficient operation of all of the vehicles 202. The vehicles 202 do not need to be of a specific type and may be internal combustion, hybrid, electric, or a combination thereof.

Each of the vehicles 12,202 may have fuel efficient acceleration parameters defined according to vehicle make and model. For example, a first vehicle of the plurality 202 may have a fuel efficiency of 10 mpg while at 50% throttle and a fuel efficiency of 20 mpg while at 25% throttle. The throttle may be associated with a normalized $$\frac{m}{s^2}$$

for all of the vehicles 202. As such, the traffic controller 220 may determine an acceleration band that all of the vehicles 202 are anticipated to be capable of fulfilling. Indeed, the predetermined acceleration band determined in step 322 may provide for the speed band determined in step 320 or vice versa. The speed band determination in step 320 may be based on roundabout road 201 parameters that having an upper threshold for traveling (e.g., roundabouts should not be traversed above 15 mph). As such, the vehicles 202 are provided with a required speed in step 324 to ensure all of the vehicles travel the road 201 at similar speeds. Additionally, the traffic controller 220 may specify vehicle speeds to ensure that vehicles do not attempt to occupy the same piece of road 201 at the same time. As such, the traffic controller 220 may require slight speed adjustments so that vehicles 202 seamlessly intersperse throughout the road 201. In step 324, the traffic controller 220 distributes speed requirements or required speed bands to the vehicles 12, 202.

The traffic controller 220 coordinates the speed of each vehicle 12, 202 based on the detection of event positions 214, 216. When no event position 214, 216 is identified, the traffic controller 220 accepts the requested vehicle speed. When one or more than one event position 214, 216 are identified, the traffic controller 220 will adjust the vehicle speed starting with the vehicle 12, 202 that has the lowest weighting factor.

Figure 4:
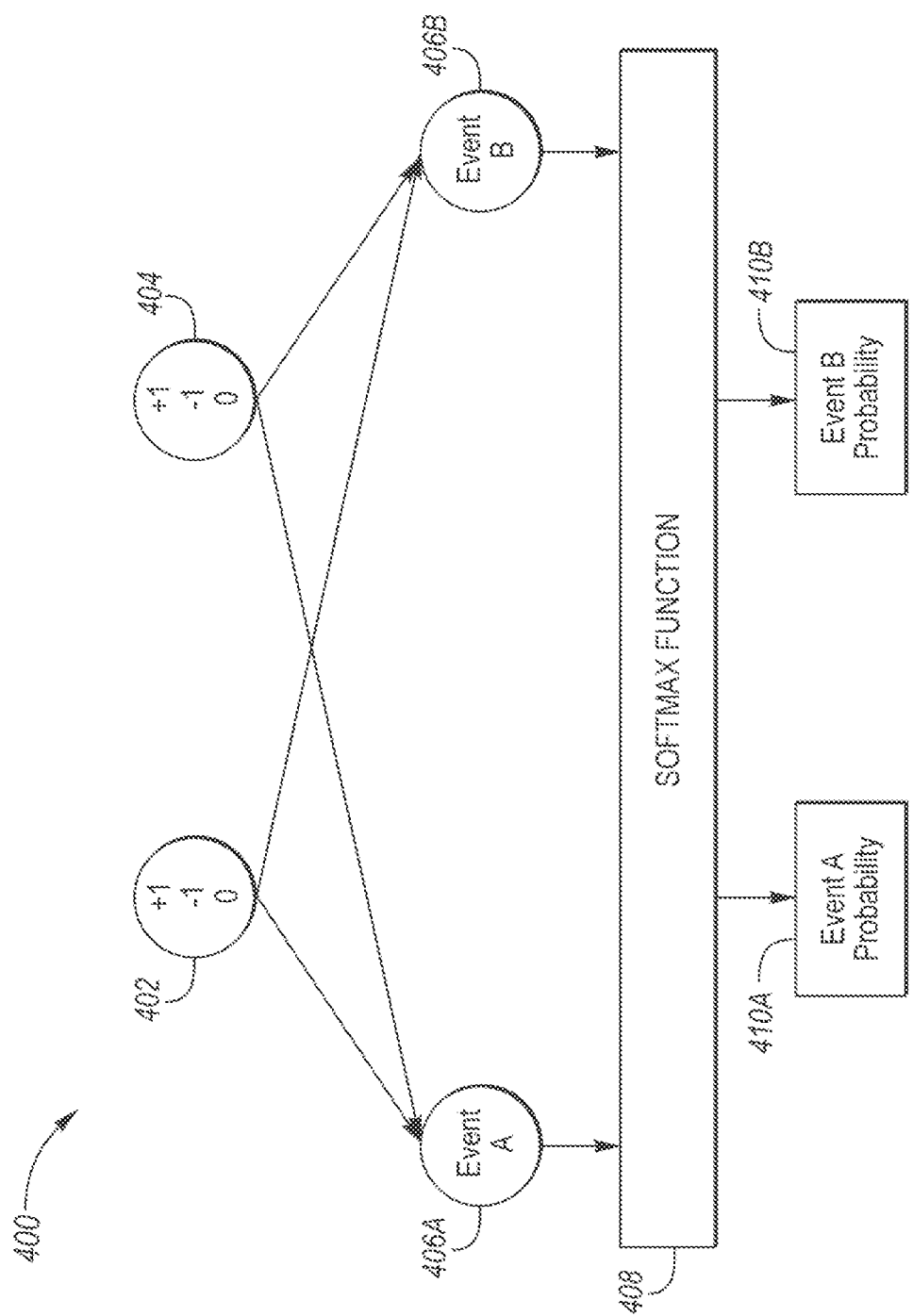
FIG. 4 is a machine learning neural network for determining event locations.

Referring to FIG. 4, different approaches can be used to detect the potential event area(s) at an instant time for the roundabout 201. For example, machine-learning based approaches and algorithms may be used. The inputs of the learning can be composed of requested vehicle speed, heading and size of each traffic participant, the geometry and structure of the roundabout, the road surface condition, the visibility condition, etc. The outputs of the learning are the potential event areas. As a non-limiting example each potential event area is rectangular, the area can be defined by the location of its four corners, with each location specified by a pre-selected coordinate system. Neural network methods can be used to implement the machine learning. The training of the network can be done offline with a set of data. Then the trained network can be used in real-time by the traffic controller 220 to predict the potential event areas for roundabout traffic coordination.

A machine-learning algorithm 400 is depicted. The machine-learning algorithm 400 may be an artificial neural network. The machine-learning algorithm 400 may have two roundabout 201 state inputs 402, 404. The machine-learning algorithm 400 may, in some instances, aggregate roundabout 201 state inputs. The machine-learning algorithm 400 may be fed roundabout 201 state inputs. For example, location state input 402 may have a value of zero to represent a particular location. The zero value for location state input 402 may indicate the vehicle is located at a particular position with respect to the roundabout (e.g., point 1). The heading state input 404 may have a value of negative one to represent a direction with respect to true north of the vehicle 12. Additional vehicle state inputs may be added for the given suggestions above to determine vehicle events points. The additional vehicle state inputs may be drawn from any other individual feature of the vehicle 12. The vehicle state inputs 402, 404 may be combined with weighting factors at each of the different events 406A-406B. Each of the weighting factors is indicated in FIG. 4 as the travel path from the state inputs 402, 404 to each of the different events 406A-406B. These weighting values may be adjusted to improve the accuracy of the system. The weighting values may be set at the factory or adjusted during vehicle use. These weighting values may be separate and distinct from priority determining values. These values may be the same or similar to the priority weighting values. A Softmax Function 408 is used to logistically regress the data values to determine the resulting probabilities for each domain-specific model confidence score 410A-410B.

Figure 5:
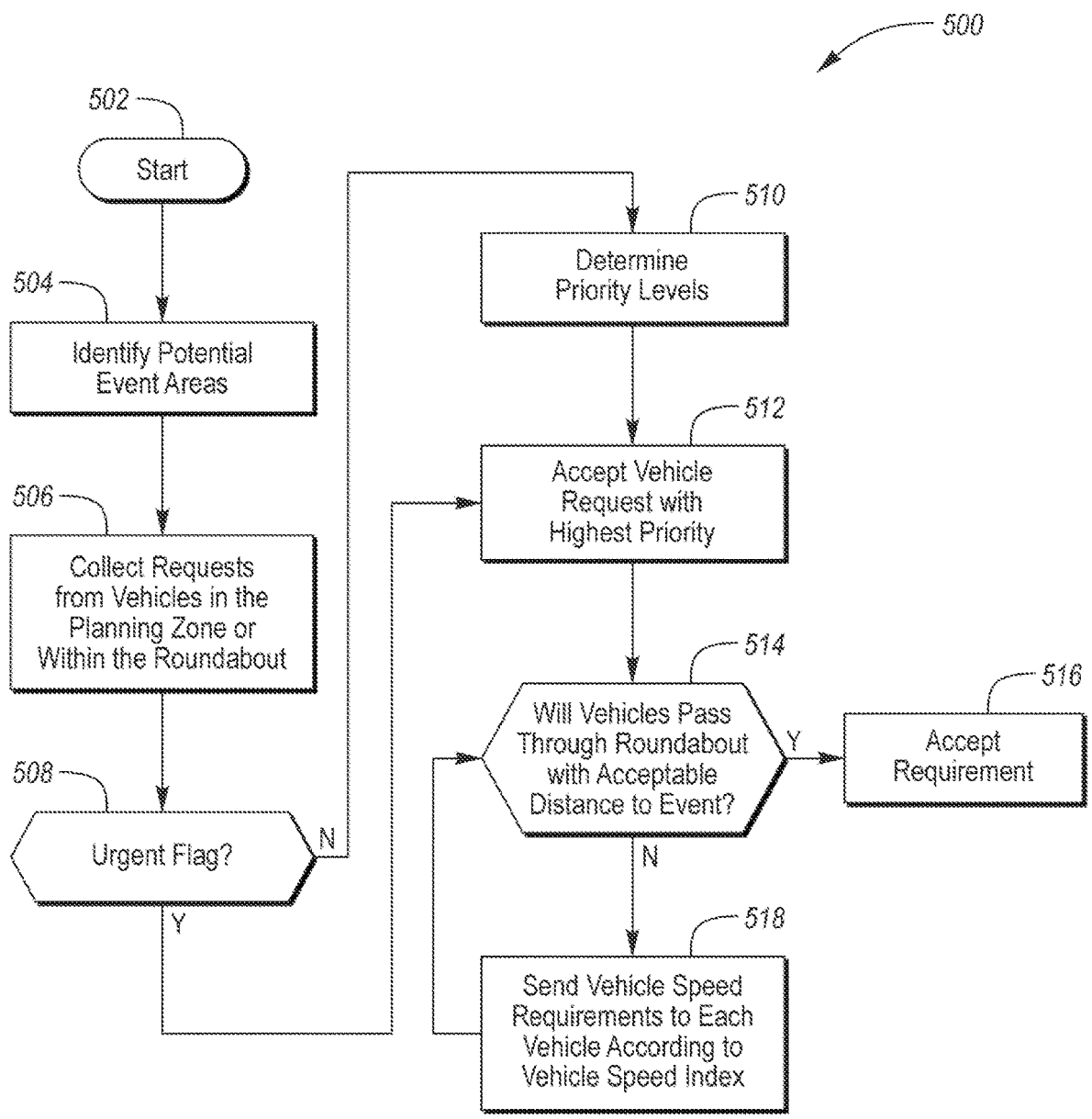
FIG. 5 is an algorithm for sending speed requirements to vehicles entering a roundabout.

Referring to FIG. 5, an algorithm 500 is shown. The algorithm 500 starts in step 502. In step 504, requests are collected by the controller 220 or by V2V, V2I, V2X communications amongst the vehicles 12, 202 and infrastructure 220. In step 506, potential event areas are determined using the machine-learning algorithms disclosed in FIG. 4 or using other methods. In step 508, the controller 220 determines whether an urgent flag is present. If an urgent flag is not present, the controller 220 determines vehicle priority levels based on a weighting system. The weights may be determined as described above and at least include the distance of the vehicle to the events 214, 216. Step 512 is reached after the priority is determined or the urgent flag is set. The controller 220 accepts the incoming vehicle speed request with the highest priority, which may include the urgent flag. In step 514, the controller 220 determines whether the vehicles will pass through the roundabout with acceptable distances from the event to ensure that events will not occur. If the vehicles will not, the controller 220 sends a speed requirement to the vehicle 12 such that the speed is incrementally or decrementally changed, reduced or increased, until the condition in step 514 is satisfied by the controller 220. As such, the speed change is incrementally changed by controller 220, sent to the vehicles 12, 202, and performed by the vehicles 12, 202. If enough space is left between vehicles 12, 202, the controller 220 and vehicle 12, 202 accept the speed requirement and speed through the roundabout 201.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric machine; and
a controller configured to, responsive to indication of a predicted event location on a roadway, adjust a speed of the vehicle via regenerative braking or propulsion of the electric machine according to a predetermined acceleration band and a speed requirement defined by a remote controller such that the vehicle passes through the roadway at a distance from the predicted event location that ensures a predicted event associated with the predicted event location does not occur, wherein the speed requirement is based on a speed request from the vehicle and a priority of the vehicle, and wherein the priority of the vehicle is based on a number of intersections anticipated to be encountered by the vehicle along the roadway.

2. The vehicle of claim 1, wherein the speed request is based on a speed of the vehicle.

3. The vehicle of claim 1, wherein the priority is further based on a distance between the vehicle and the roadway.

4. The vehicle of claim 1, wherein the priority is assigned by the vehicle.

5. The vehicle of claim 1, wherein the priority is assigned by the remote controller.

6. The vehicle of claim 1, wherein the priority is further based on a fuel efficiency of the vehicle derived from a make and model of the vehicle.

7. The vehicle of claim 6, wherein the predetermined acceleration band is based on the fuel efficiency.

8. The vehicle of claim 1, wherein the controller is further configured to adjust the speed at a maximum allowed by the predetermined acceleration band.

9. A traffic controller comprising:
a controller configured to,
responsive to receiving a speed request having a priority less than a predetermined threshold and defining a speed outside of a predetermined speed band from one of a plurality of vehicles approaching a road, issue a speed requirement based on the priority to cause a speed of the one to be within the predetermined speed band before entering the road, and
responsive to the priority being greater than the predetermined threshold, adjust the predetermined speed band to encompass the speed defined by the speed request, wherein the priority is based on a number of intersections anticipated to be encountered by the one along the road.

10. The traffic controller of claim 9, wherein the speed request is based on a speed of the one.

11. The traffic controller of claim 9, wherein the priority is further based on a distance between the one and the road.

12. The traffic controller of claim 9, wherein the priority is further based on an event detected by the one.

13. The traffic controller of claim 9, wherein the priority is further based on a fuel efficiency of the one derived from a make and model of the one.

14. The traffic controller of claim 9, wherein the speed is adjusted at a maximum acceleration within a predetermined acceleration band.

15. A traffic controller comprising:
a controller configured to, responsive to indication of a predicted event location on a roadway and receiving a speed request having a priority greater than a predetermined threshold and defining a speed outside of a speed band from one of a plurality of vehicles approaching the roadway, issue a speed requirement based on the speed request to cause a speed of the plurality to be within a band of the speed defined by the speed request before the one enters the roadway such that the plurality passes through the roadway at a distance from the predicted event location that ensures a predicted event associated with the predicted event location does not occur, wherein the priority is based on a number of intersections anticipated to be encountered by the one along the roadway.

16. The traffic controller of claim 15, wherein the controller is further configured to, responsive to the priority being less than the predetermined threshold, issue the speed requirement based on the priority to cause a speed of the one to be within the speed band before entering the roadway.

* * * * *